(12) United States Patent
Melcher

(10) Patent No.: US 9,061,658 B2
(45) Date of Patent: Jun. 23, 2015

(54) WIPER CONTROL

(71) Applicant: SAINT-GOBAIN GLASS FRANCE, Courbevoie (FR)

(72) Inventor: Martin Melcher, Herzogenrath (DE)

(73) Assignee: SAINT-GOBAIN GLASS FRANCE (FR)

( * ) Notice: Subject to any disclaimer, the term of this patent is extended or adjusted under 35 U.S.C. 154(b) by 0 days.

(21) Appl. No.: 14/369,186

(22) PCT Filed: Nov. 20, 2012

(86) PCT No.: PCT/EP2012/073045
§ 371 (c)(1),
(2) Date: Jun. 26, 2014

(87) PCT Pub. No.: WO2013/104456
PCT Pub. Date: Jul. 18, 2013

(65) Prior Publication Data
US 2015/0019075 A1     Jan. 15, 2015

(30) Foreign Application Priority Data
Jan. 11, 2012    (EP) ..................................... 12150726

(51) Int. Cl.
*G06F 7/00*      (2006.01)
*B60S 1/08*      (2006.01)
(52) U.S. Cl.
CPC ............. *B60S 1/0818* (2013.01); *B60S 1/0896* (2013.01)
(58) Field of Classification Search
CPC ............................... Y10S 15/15; B60S 1/0896
USPC ........................................................... 701/36
See application file for complete search history.

(56) References Cited

U.S. PATENT DOCUMENTS

| 4,339,698 | A  | * | 7/1982 | Kearns .......................... 318/444 |
| 6,420,845 | B1 | * | 7/2002 | Mackel et al. ................. 318/443 |
| 7,235,944 | B2 |   | 6/2007 | Morishita et al. |
| 2002/0045037 | A1 | | 4/2002 | Boire et al. |
| 2003/0036859 | A1 | * | 2/2003 | Muller et al. .................... 702/45 |
| 2006/0130877 | A1 | | 6/2006 | Huntzicker et al. |

(Continued)

FOREIGN PATENT DOCUMENTS

| DE | 10238168 | 8/2003 |
| DE | 10261244 | 7/2004 |

(Continued)

OTHER PUBLICATIONS

PCT International Search Report mailed on Dec. 20, 2012 for PCT Application PCT/EP2012/073045 filed on Nov. 20, 2012 in the name of Saint-Gobain Glass France (German Original + English Translation).

(Continued)

*Primary Examiner* — Calvin Cheung
*Assistant Examiner* — Paula L Schneider
(74) *Attorney, Agent, or Firm* — Steinfl & Bruno LLP

(57) ABSTRACT

A method for cleaning and drying a transparent pane is described. The method uses a hydrophobic coating in order to wipe off the residual moisture, wherein the quantity of water on the outside of the pane is measured after the vehicle engine has been switched off and, in the event of a constant or decreasing quantity of water, at least one wiping operation is carried out after a waiting time of at least 1 minute. A device for cleaning and drying the transparent pane is also described.

20 Claims, 3 Drawing Sheets

(56) References Cited

U.S. PATENT DOCUMENTS

Figure 1:
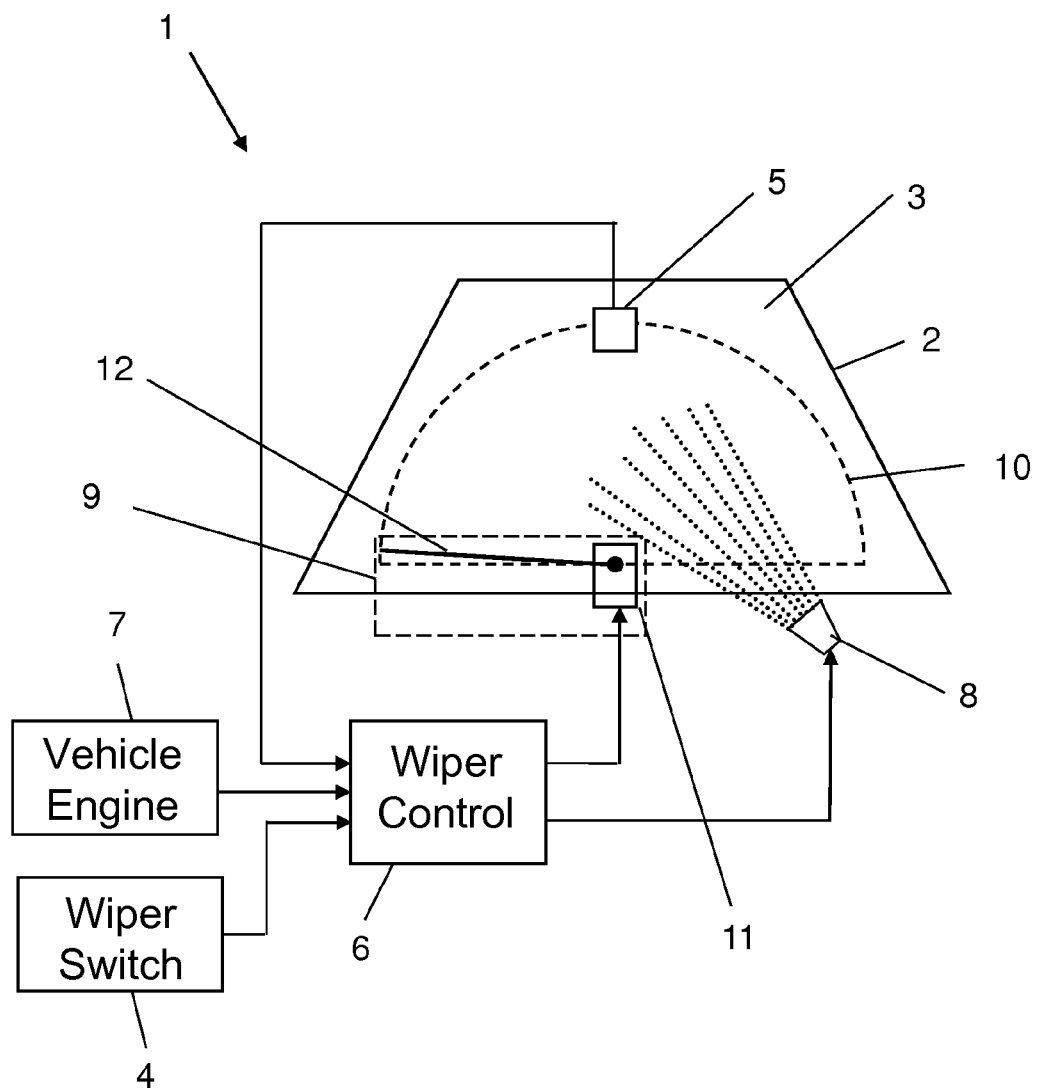

| | | |
|---|---|---|
| 2007/0241612 A1 | 10/2007 | Jacoby et al. |
| 2008/0241523 A1 | 10/2008 | Huignard et al. |
| 2010/0095472 A1* | 4/2010 | Van De Rostyne et al. .................. 15/250.361 |
| 2011/0305874 A1 | 12/2011 | Thoumazet et al. |

FOREIGN PATENT DOCUMENTS

| | | |
|---|---|---|
| DE | 102007037548 | 2/2009 |
| EP | 0847965 | 6/1998 |
| EP | 1614594 | 1/2006 |
| EP | 1720808 | 11/2006 |
| EP | 1971509 | 9/2008 |
| GB | 2357541 | 6/2001 |
| WO | 2010/079299 | 7/2010 |
| WO | 2011/070293 | 6/2011 |

OTHER PUBLICATIONS

PCT Written Opinion mailed on Dec. 20, 2012 for PCT Application PCT/EP2012/073045 filed on Nov. 20, 2012 in the name of Saint-Gobain Glass France (German Original + English Translation).

PCT International Preliminary Report on Patentability mailed on Jul. 15, 2014 for PCT Application PCT/EP2012/073045 filed on Nov. 20, 2012 in the name of Saint-Gobain Glass France (German Original + English Translation).

* cited by examiner

WIPER CONTROL

CROSS REFERENCE TO RELATED APPLICATIONS

The present application is the US national stage of International Patent Application PCT/EP2012/073045 filed on Nov. 20, 2012 which, in turn, claims priority to European Patent Application EP 12150726.3 filed on Jan. 11, 2012.

The invention relates to a method and a device for cleaning and drying a transparent pane having a hydrophobic coating for wiping off the residual moisture.

The front window panes and rear window panes of motor vehicles are usually equipped with windshield wipers and wiper systems that free the window panes of drops of water in the event of rain or spray. In middle and luxury class vehicles, the wiper systems are, for the most part, equipped with microprocessors and rain sensors that control the wiping operation automatically and adapt the wiping interval to the amount of rain striking a pane. Such systems are, for example, known from DE 102 38 168 A1 and EP 1 614 594 A1.

To support the wiper systems, water repellent, hydrophobic coatings are used on the outer sides of the window panes. The hydrophobic coating results in a beading effect and in the formation of small water droplets, as described by Schneider et al. in the FAT-monograph series (Research Association for Automotive Technology Monograph Series) No. 167, ISSN 0933-050 X. The small water droplets are aerodynamically removed from the field of vision. The use of the windshield wiper is significantly reduced and visibility is improved. Moreover, fewer disturbing effects and reflections occur, in particular with darkness and opposing light. A hydrophobic coating is, for example, obtained by plasma activation of a silicon oxycarbide layer, as is known from EP 1 720 808 A1 or WO 2010/079299 A1.

In the development of hydrophobic coatings of windshields, it is customarily assumed that the mechanical action of the windshield wiper damages the coating, as is known from GB 2 357 541 A and WO 2010/079299 A1. It is likewise assumed that frequent cleaning of the pane is damaging to the coating due to the associated mechanical and chemical attacks.

In contrast, the object of the present invention consists in advantageously improving a method and a device for increasing the service life of a hydrophobic coating. This and other objects are accomplished by a method, a device, and a use with the characteristics of the coordinated claims. Advantageous embodiments of the invention are indicated by the characteristics of the subclaims.

As extensive experiments of the inventor demonstrated, the action and service life of a hydrophobic coating is significantly degraded by the drying of water on the coating. With drying, lime residues and dirt particles remain on the coating and reduce its hydrophobic action.

The invention comprises a method for cleaning and drying a transparent pane having a hydrophobic coating for wiping off the residual moisture, wherein after a motor vehicle engine is turned off, a quantity of water on the outer side of the pane is checked and, in the case of a constant or decreasing quantity of water, at least one wiping operation is carried out after a waiting time of at least 1 minute.

The quantity of water is preferably the minimum quantity of water that can be measured by the rain sensor, preferably at least one drop of water in the sensor range of the rain sensor or a corresponding film of water that is distributed over the sensor range of the rain sensor. The film of water can, for example, be a dew film that condenses in the morning on the window of a vehicle parked outdoors.

The method according to the invention is preferably controlled by a wiper control, for example, by a microprocessor or a microcontroller controlled wiper control. The wiper control is programmatically configured such that the method described in the following for cleaning and drying the pane can be carried out. The wiper control can be integrated into the already present control of the windshield wiper or can be realized as an external component. The wiper control can have other functions, for instance, speed selection for the windshield wiper or rain-dependent interval switching. The waiting time is preferably determined by a timer. The timer is, for example, integrated into the wiper control or, alternatively, is an external electronic element. The quantity of water is advantageously measured by a rain sensor.

The method according to the invention is performed based on a manually or automatically activated operation. An automated operation is started, for example, by turning off the motor vehicle engine or turning off the electrical ignition.

After the start of the operation, in a Step A, the timer is reset. In Step B, the switching status of the wiper switch is checked. The wiper arrangement comprising the wiper motor and the windshield wiper can be controlled manually with the wiper switch. The wiper switch usually also serves for controlling the speed of the windshield wiper. If the wiper switch is ON, the windshield wiper is already in wiper operation and cleaning and drying according to the invention is not necessary. In this case, Step A is repeated until the wiper switch is turned off. If the wiper switch is OFF, Step C is performed.

In Step C, the quantity of water on the pane is checked. For this purpose, the data signal of the rain sensor is evaluated. If the rain sensor delivers the signal of a dry pane, Step A is performed. This is the case if it has not rained or the pane is situated in a dry place, for example, in a garage. In both cases, drying of the pane is not necessary and a wiping operation does not result in an increase of the service life or in an improvement of the action of the hydrophobic coating. If the rain sensor delivers the signal of a wet pane, Step D is performed.

In Step D, the rain sensor is rechecked. If the signal of the rain sensor corresponds to newly appearing raindrops, Step A is performed. In the case of continuing rain, cleaning and drying of the pane according to the invention is not possible and a wiping operation is pointless. If the rain sensor detects no new raindrops, Step E is performed.

In Step E, the timer is checked. If the timer indicates a period shorter than a defined waiting time W, Step B is performed. If the timer indicates a period longer than or equal to the waiting time W, Step F is performed. This has the result that the cleaning and drying of the pane according to the invention occurs only after the end of the rain and a waiting time W.

In an advantageous embodiment of the method according to the invention, the at least one wiper operation is carried out after a waiting time W of 1 min. to 30 min., preferably 2 min. to 10 min. The waiting time W results from optimization of two opposing processes: On the one hand, the waiting time W must be selected long enough to ensure that, for example, a rain shower has ended and no more raindrops are striking the pane. At the same time, the water must not dry too long on the pane to achieve the effect of cleaning and drying of the pane according to the invention.

In Step F, at least one wiping operation is performed. This occurs through outputting a control signal from the wiper control to the wiper arrangement. Then, the method according to the invention begins again in step A or the operation is terminated.

In an advantageous embodiment of the method according to the invention, one to ten wiping operations, preferably one to three, and particularly preferably one wiping operation is carried out. The number of wiping operations necessary for drying an average wet pane depends on the size and the model of the wiper arrangement and the pane and can be determined in simple experiments.

In an advantageous embodiment of the method according to the invention, before or during the wiper operation, a windshield washer system is turned on. A cleaning liquid is sprayed onto the hydrophobic coating of the pane. This has the particular advantage that soiling such as dust, oil, and insects is removed better and pane is again completely moistened. This enables particularly good cleaning and drying of the pane.

It is particularly advantageous for the method according to the invention to be performed uninterruptedly in the OFF state of the motor vehicle, in particular relatively long periods of inoperation in the open with no roof. By means of the method according to the invention, rainwater striking the pane is removed after the end of the rain and the pane is dried. This maintains the water repellent action of the hydrophobic coating over a long period of time.

In an alternative improvement of the method according to the invention, in Step F, it is first checked whether the vehicle engine is still turned on or has been turned off for less than a defined shutdown time Z. If the period since since the vehicle was turned off or the electrical ignition was switched off is less than the shutdown time Z, the wiping operation is performed. The shutdown time Z is preferably from 10 min. to 60 min. and particularly preferably from 20 min. to 40 min. If the shutdown time Z is exceeded, Step A is performed or the operation is terminated. This has the advantage that the vehicle in a parked, turned off position does not spontaneously begin to wipe the panes after a rain shower. This could completely discharge the vehicle battery in the event of long inoperation of the vehicle. Moreover, it could alarm passers-by or other motorists if the windshield wipers of a parked vehicle without a driver are turned on.

The invention further extends to a device for cleaning and drying a transparent pane having a hydrophobic coating for wiping off the residual moisture, comprising at least:
 a wiper arrangement with a wiper on the outer side of the pane and a wiper motor for performing a wiper operation,
 a rain sensor for measuring the quantity of water on the outer side of the pane,
 a wiper control connected to the wiper arrangement and the rain sensor,
wherein after the vehicle engine is turned off, in the case of a constant or decreasing quantity of water, the wiper control carries out at least one wiper operation after a waiting time of at least 1 min.

The pane according to the invention comprises single glazings made of single panes or multiple glazings and laminated glazings made of multiple single panes that are bonded to each other by intermediate layers as well as insulating glass panes that contain gas-filled insulation areas. All transparent substrates that are thermally and chemically stable as well as dimensionally stable under the conditions of the production and use of the pane according to the invention and have a hydrophobic surface or can be coated with a hydrophobic coating, are, fundamentally, suitable as panes of the laminated pane or the single pane.

The pane preferably contains glass, particularly preferably flat glass, float glass, quartz glass, borosilicate glass, soda lime glass, or clear plastics, preferably rigid clear plastics, in particular, polyethylene, polypropylene, polycarbonate, polymethyl methacrylate, polystyrene, polyamide, polyester, polyvinyl chloride, and/or mixtures thereof. Suitable types of glass are known, for example, from EP 0 847 965 B1.

The thickness of the pane can vary widely and thus be eminently adapted to the requirements of the individual case. Preferably, panes with the standard thicknesses of 1.0 mm to 25 mm, preferably of 1.4 mm to 2.5 mm are used for motor vehicle glass and preferably of 4 mm to 25 mm for furniture, devices, and buildings, in particular for electrical heaters. The size of the pane can vary widely and is determined by the size of the application according to the invention. The pane can have any three-dimensional shape. Preferably, the pane is flat or curved slightly or greatly in one or more spatial directions. In particular, flat substrates are used. The pane can be colorless or tinted.

In an advantageous embodiment, the laminated pane according to the invention contains at least two panes that are bonded to each other by at least one intermediate layer. The intermediate layer preferably contains a thermoplastic plastic, such as polyvinyl butyral (PVB), ethylene vinyl acetate (EVA), polyurethane (PU), polyethylene terephthalate (PET), or multiple layers thereof, preferably with thicknesses of 0.3 mm to 0.9 mm.

All coatings that can be applied to the individual panes or laminated panes mentioned in the introduction and that retain their hydrophobic action for an adequately long time under the conditions of intended use, for example, as a windshield of a motor vehicle are suitable as a hydrophobic coating.

Examples of particularly advantageous hydrophobic coatings are found in EP 1 720 808 A1, WO 2010/0729299 A1, and WO 2011/070293 A1. Such hydrophobic coatings preferably contain alkyl silane, and in particular fluorinated alkyl silane. The hydrophobic coating can contain a base layer made of silicon dioxide $SiO_2$, which optionally contains one element or a plurality of elements from the group Al, B, C, and Zr, particularly preferably silicon oxycarbide $SiO_xC_y$. The base layer is preferably arranged between the pane and the alkyl silane layer. The base layer is preferably activated in a plasma of argon, helium, nitrogen, oxygen, water vapor, or a mixture thereof. Such coatings are particularly suitable for motor vehicle window panes, largely weather resistant, and stable against mechanical abrasion.

The arrangement further comprises at least one rain sensor that is suitable to detect wetness and raindrops on the outer side of the pane. The rain sensor must, moreover, be able to detect new raindrops, i.e., a change in the raindrops on the pane. Suitable rain sensors are known, for example, from DE 102 61 244 A1, DE 10 2007 037 548 A1, and EP 1 971 509 B1 and measure the quantity of rain capacitively or with optical methods.

Furthermore, the invention extends to the use of the method according to the invention or the device according to the invention in means of transportation for travel on land, in the air, or on water, in particular in motor vehicles, in particular front and rear windshields, as well as functional and/or decorative individual pieces and built-in components in furniture, devices, and buildings.

It is understood that the various embodiments can be realized individually or in any combinations. In particular, the characteristics mentioned above and those to be explained in the following can be used not only in the combinations indicated but also in other combinations or alone without departing from the scope of the present invention.

The invention is explained in detail in the following with reference to drawings. The drawings are schematic representations and not true to scale. The drawings in no way restrict the invention.

Figure 2:
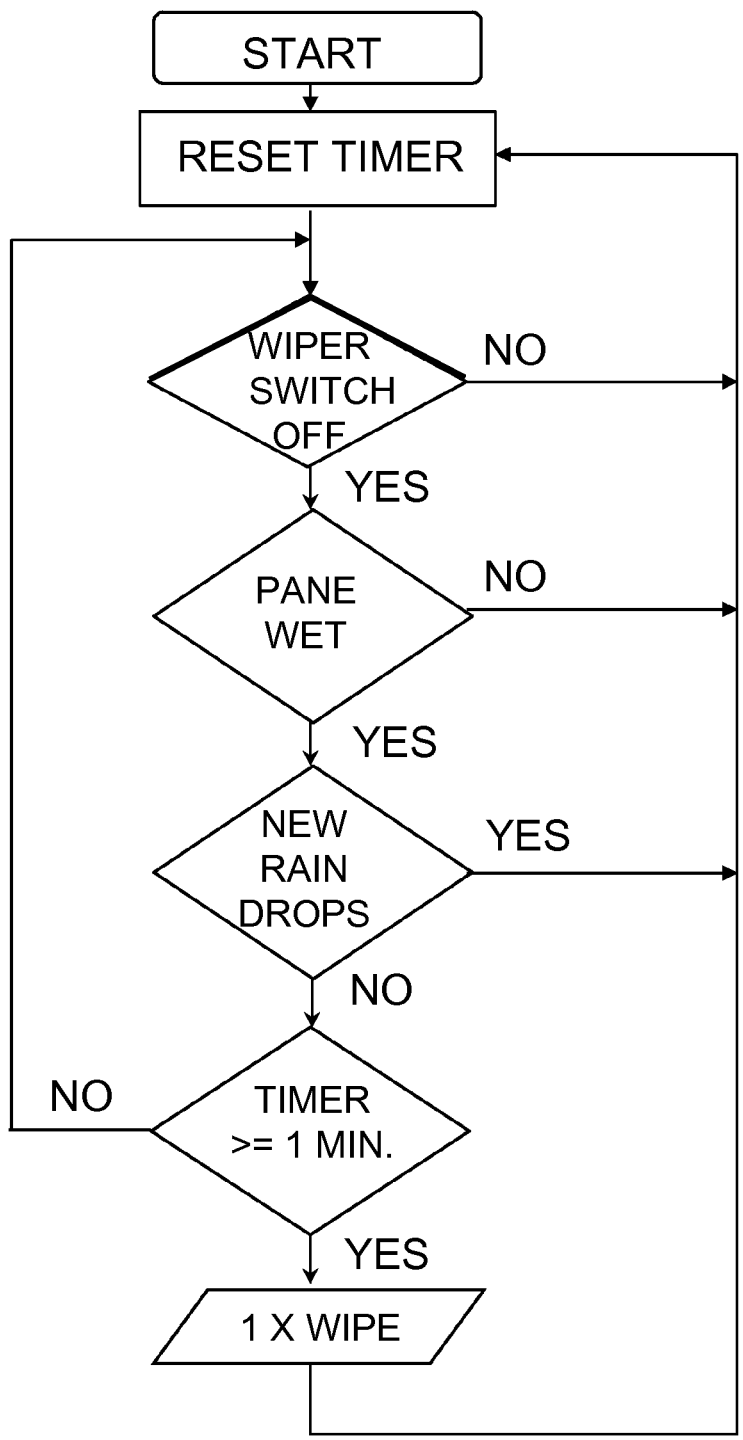
Figure 3:
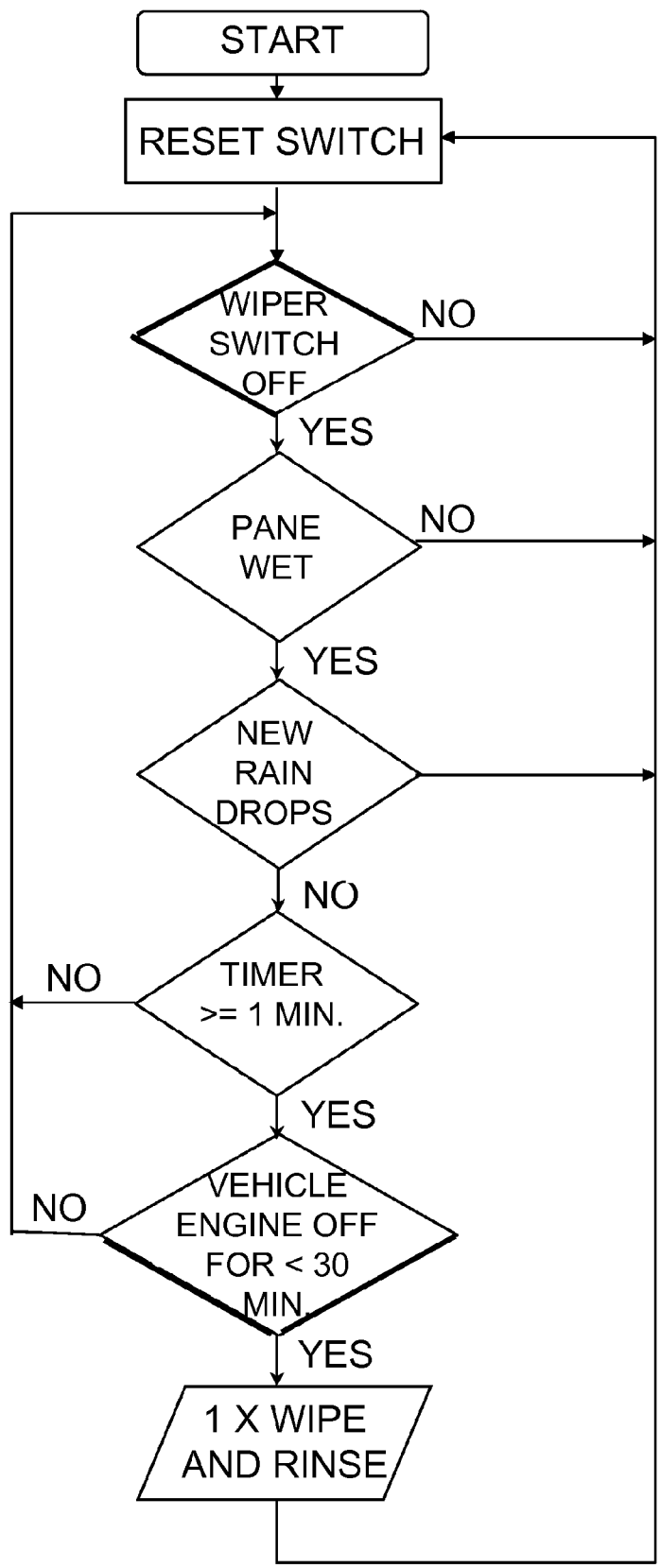

They depict:

FIG. 1 a schematic representation of a pane arrangement implemented according to the invention, FIG. 2 a flowchart of an exemplary embodiment of the method according to the invention, and FIG. 3 a flowchart of another exemplary embodiment of the method according to the invention.

FIG. 1 is a schematic representation of a pane arrangement implemented according to the invention identified with the reference character 1. The pane arrangement 1 comprises a pane 2 using the example of a transparent windshield of a motor vehicle and is implemented here as a laminated pane. The pane 2 has a rigid outer pane and a rigid inner pane, both of which are implemented as single panes and bonded to one another via a thermoplastic adhesive layer. The two individual panes are approx. the same size and have roughly a trapezoid-shaped curved outline. The invention is not limited to this and the pane 2 can even have any other shape suitable for the practical application. The two individual panes are made of a glass material, such as float glass, cast glass, or ceramic glass or a nonglass material, for example, plastic, in particular polystyrene (PS), polyamide (PA), polyester (PE), polyvinyl chloride (PVC), polycarbonate (PC), polymethyl methacrylate (PMA), or polyethylene terephthalate (PET). Plastic, in particular based on polyvinyl butyral (PVB), ethylene vinyl acetate (EVA), and polyurethane (PU), can, for example, be used as the adhesive layer to bond the two individual panes. The pane 2 can include other functional layers, on or between the two individual panes, for example, heatable layers or layers that reflect thermal radiation.

The outer side of the pane 2 has a hydrophobic coating. The term "outer side of the pane" 2 means, in the context of the present invention, the surface of the pane 2 turned away from the vehicle interior. The hydrophobic coating contains, for example, a base layer made of silicon oxycarbide and an outer hydrophobic coating made of fluorinated alkyl silane. Such coatings are known, for example, from WO 2010/0729299 A1 or WO 2011/070293 A1 and are described in detail therein.

The pane arrangement 1 further has a rain sensor 5, that is, for example, arranged on the interior side of the pane 2. The rain sensor is, for example, an optical rain sensor that has an infrared LED and that measures the quantity of water on the outer side of the pane 2 by means of the reflection of the infrared light.

The rain sensor 5 is connected using data technology via a data line to a microprocessor-based wiper control 6. The wiper control 6 is configured programmatically such that the method according to the invention for cleaning and drying the pane 2 can be carried out. The wiper control 6 is further connected via a data line to a wiper switch 4. The wiper control 6 processes the incoming data from the rain sensor 5 and from the wiper switch 4 and issues a control signal corresponding to the method according to the invention to a wiper arrangement 9. The wiper arrangement 9 includes a wiper motor 11 and a windshield wiper 12. The wiper arrangement 9 can even have a plurality of wiper motors 11 and/or windshield wipers 12. By means of the control signal of the wiper control 6, one wiping operation is performed and the windshield wiper 12 moves over the wiper zone 10 of the pane 2. The pane arrangement 1 can include a windshield washer system 8, which is also switched on and off by the wiper control 6 via a control line.

The wiper control 6 can, additionally, be connected via a data line to the motor vehicle engine 7 or to the electrical ignition. In this manner, data concerning the engine status are fed to the wiper control 6, and, for example, the method according to the invention is started automatically.

FIG. 2 depicts a flowchart or sequence diagram to illustrate an exemplary embodiment of the method according to the invention. A concrete procedure for cleaning and drying the pane 2 is started automatically here after the motor vehicle engine is switched off. It would also be conceivable for the procedure to be activated or started by the manual actuation of a switch element (not shown) in a control console of the vehicle.

After the start of the procedure, a timer integrated into the wiper control 6 is reset (Step A). Then, in Step B, the switching status of the wiper switch 4 is checked. If the wiper switch 4 is turned on, the windshield wiper is still in the wiping operation and Step A is repeated. If the wiper switch 4 is turned off, Step C is performed.

In Step C, the data signal of the rain sensor 5 is checked. If the pane 2 is dry, Step A is performed again. If the pane 2 is wet, Step D is performed.

In Step D, the rain sensor is checked again. If the signal of the rain sensor corresponds to newly added rain drops, Step A is performed again. If the rain sensor detects no new raindrops, the next Step E is performed.

In Step E, the timer is checked. If the timer indicates, for example, a period shorter than 3 minutes, Step B is performed. If the timer indicates a period greater than or equal to 3 minutes, one wiping operation is, for example, performed. Then, the method according to the invention is restarted in Step A or the operation is terminated.

In FIG. 3 depicts a flowchart or sequence diagram of an improvement of the method according to the invention from FIG. 2. Before carrying out the wiping operation, the period of time from the switching off of the vehicle engine is determined and the wiping operation is carried out only if the vehicle engine was turned off less than, for example, 30 minutes earlier. Moreover, before or during the wiping operation, the window washer system 8 is turned on and the pane 2 is sprayed with a cleaning solution.

Table 1 presents contact angle measurements using the example of a pane 2 having a hydrophobic coating 3 that had been wiped with the method according to the invention. As a comparative example, contact angle measurements on a pane 2 having a hydrophobic coating 3 are presented, wherein the pane 2 had been wiped according to the prior art. In each case, in the table, the contact angle of the unused coating and the contact angle of the coating after a test run of 14 days is stated. The term "contact angle" designates the angle that a drop of liquid forms on the surface of a solid with this surface. Surfaces with the contact angle >90° are referred to as hydrophobic. The higher the contact angle, the more hydrophobic the surface and the better the water repellent action of the coating.

TABLE 1

|  | Contact angle of the new coating | Contact angle of the coating after test run | Change |
|---|---|---|---|
| Example: Wiping with method according to the invention | 118° | 108° | −8% |
| Comparative example: Wiping according to the prior art | 120° | 80° | −33% |

The contact angle of water on a new, unused coating 3, immediately after its manufacture, is 118° in the Example and 120° in the Comparative Example. After the test run, the contact angle in the Example with wiping with the method according to the invention is reduced by 8% to 108°. The contact angle is thus greater than 90° and thus sufficiently water repellent for the desired operation, for example, as a windshield in a motor vehicle.

The coating 3 of the Comparative Example is wiped during the test run according to the prior art, as is customary in standard production models of motor vehicles. This means that the pane is wiped manually or using a rain sensor during precipitation. Drying of the pane 2 according to the invention does not occur after precipitation. The contact angle of the coating 3 according to the Comparative Example is reduced after the test run by 33% to 80°. A hydrophobic coating 3 with a contact angle of 80° does not have sufficient water repellent action for the desired operation, for example, as a windshield in a motor vehicle.

As the experiments of the inventor showed, the hydrophobic action of the coating 3 of the pane 2 is maintained by the cleaning and drying of the wet pane and the service life of the coating is extended. It is particularly advantageous if the method according to the invention is performed uninterruptedly in the turned off status of the motor vehicle, in particular in the case of relatively long inoperation in the open with no roof. By means of the method according to the invention, the hydrophobic coating 3 of the pane 2 is dried quickly and water is wiped away. Soiling such as dust and insect residue is removed before drying on and solidifying. Deposition of lime from drying water is reliably prevented. By means of this measure, the water repellent action of the hydrophobic coating 3 is retained, for example, beyond the 100,000 operational kilometers required by the automobile industry.

This result was unexpected and surprising for the person skilled in the art.

List of Reference Characters
1 pane arrangement
2 pane
3 hydrophobic coating
4 wiper switch
5 rain sensor
6 wiper control
7 motor vehicle engine
8 window washer system
9 wiper arrangement
10 wiper zone
11 wiper motor
12 windshield wiper
W waiting time
Z shutdown time

The invention claimed is:

1. A method for cleaning and drying a transparent pane having a hydrophobic coating for wiping off residual moisture of a motor vehicle having a motor vehicle engine, comprising:
A) starting an automated wiping operation by turning off the motor vehicle engine;
B) after the motor vehicle engine is turned off, measuring by a rain sensor a quantity of water on an outer side of the pane; and
C) in the case of a constant or a decreasing quantity of water, after a waiting time of at least 1 minute measured by a timer, carrying out at least one wiping operation, wherein the wiping operation is controlled by a wiper control.

2. The method according to claim 1, comprising:
D) resetting the timer;
E) checking a wiper switch, whereupon Step D) is performed if the wiper switch is turned on, or Step F) is performed if the wiper switch is turned off;
F) checking the rain sensor, whereupon Step D) is performed if the pane is dry, or Step G is performed if the pane is wet;
G) checking the rain sensor, whereupon Step D) is performed if new rain drops are detected, or Step H) is performed if no new rain drops are detected;
H) checking the timer, whereupon Step E) is performed if the timer indicates a period less than the waiting time, or Step I) is performed if the timer indicates a period greater than or equal to the waiting time; and
I) carrying out at least one wiping operation and repeating Step D).

3. The method according to claim 1, wherein one to ten wiping operations are carried out.

4. The method according to claim 3, wherein one to three wiping operations are carried out.

5. The method according to claim 3, wherein one wiping operation is carried out.

6. The method according to claim 1, wherein the wiping operation is carried out after a waiting time of 1 minute to 30 minutes.

7. The method according to claim 6, wherein the waiting time is 2 minutes to 10 minutes.

8. The method according to claim 1, wherein before or during the wiping operation, a windshield washer system is switched on.

9. The method according to claim 1, wherein the wiping operation is carried out only if the motor vehicle engine had been switched off before a shutdown time of at most 120 minutes.

10. The method according to claim 9, wherein the shutdown time is at most 60 minutes.

11. The method according to claim 9, wherein the shutdown time is at most 30 minutes.

12. The method according to claim 1, wherein carrying out the wiping operation is performed on the transparent pane having a hydrophobic coating in a vehicle of transportation for travel on land, in air, or on water.

13. A device for cleaning and drying a transparent pane for wiping off the residual moisture of a motor vehicle having a motor vehicle engine, comprising at least:
the transparent pane having a hydrophobic coating;
a wiper arrangement with a wiper on the outer side of the pane and a wiper motor for performing a wiping operation;
a rain sensor for measuring the quantity of water on the outer side of the pane; and
a wiper control connected to the wiper arrangement and the rain sensor,
wherein after the motor vehicle engine is turned off, an automated wiping operation is started by turning off the motor vehicle engine, in the case of a constant or a decreasing quantity of water, the wiper control carries out at least one wiping operation, after a waiting time of at least 1 minute.

14. The device according to claim 13, wherein the hydrophobic coating contains a fluorinated alkyl silane coating.

15. The device according to claim 14, wherein the hydrophobic coating contains silicon dioxide $SiO_2$ and, optionally, one element or a plurality of elements from the group Al, B, C, and Zr, preferably silicon oxycarbide $SiO_xC_y$.

16. The device according to claim 13, wherein the transparent pane having a hydrophobic coating is in a vehicle of transportation for travel on land, in air, or on water.

17. A method for cleaning and drying a transparent pane having a hydrophobic coating for wiping off residual moisture, comprising:
- A) after a motor vehicle engine is turned off, measuring by a rain sensor a quantity of water on an outer side of the pane; and
- B) in the case of a constant or a decreasing quantity of water, after a waiting time of at least 1 minute measured by a timer, carrying out at least one wiping operation, wherein the wiping operation is controlled by a wiper control, and wherein the wiping operation is carried out only if the motor vehicle engine has been switched off before a shutdown time of at most 120 minutes.

18. The method according to claim 17, comprising:
- C) resetting the timer;
- D) checking a wiper switch, whereupon Step C) is performed if the wiper switch is turned on, or Step E) is performed if the wiper switch is turned off;
- E) checking the rain sensor, whereupon Step C) is performed if the pane is dry, or Step F) is performed if the pane is wet;
- F) checking the rain sensor, whereupon Step C) is performed if new rain drops are detected, or Step G) is performed if no new rain drops are detected;
- G) checking the timer, whereupon Step D) is performed if the timer indicates a period less than the waiting time, or Step H) is performed if the timer indicates a period greater than or equal to the waiting time; and
- H) carrying out at least one wiping operation and repeating Step C).

19. The method according to claim 17, wherein the wiping operation is carried out after a waiting time of 1 minute to 30 minutes.

20. The method according to claim 17, wherein before or during the wiping operation, a windshield washer system is switched on.

* * * * *